US012399078B2

(12) United States Patent
Perry et al.

(10) Patent No.: US 12,399,078 B2
(45) Date of Patent: Aug. 26, 2025

(54) USING A LOOPBACK COMPONENT TO TEST A SINGLE FIBER OPTIC STRAND

(71) Applicant: AT&T INTELLECTUAL PROPERTY I, L.P., Atlanta, GA (US)

(72) Inventors: Ricky Perry, Cumming, GA (US); Julie Lorentzen, Dublin, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 176 days.

(21) Appl. No.: 18/063,545

(22) Filed: Dec. 8, 2022

(65) Prior Publication Data

US 2024/0192083 A1 Jun. 13, 2024

(51) Int. Cl.
*G01M 11/00* (2006.01)

(52) U.S. Cl.
CPC .................................. *G01M 11/31* (2013.01)

(58) Field of Classification Search
CPC ... G01M 11/31; H04B 10/035; H04B 10/071; G02B 6/44528; H04J 14/0205; H04J 14/0204; H04Q 2213/1301; H04L 43/0811; H04L 5/14; H04L 43/0852; H04L 43/0805; H04L 43/0817
See application file for complete search history.

(56) References Cited

U.S. PATENT DOCUMENTS

| | | | |
|---|---|---|---|
| 8,750,702 B1* | 6/2014 | Figueira | G01M 11/31 398/16 |
| 2009/0028549 A1* | 1/2009 | Zhang | H04J 14/02 398/16 |
| 2014/0270751 A1* | 9/2014 | Figueria | H04B 10/0773 398/16 |
| 2017/0310390 A1* | 10/2017 | Shiner | H04B 10/0775 |
| 2020/0099445 A1* | 3/2020 | Storey | H04B 10/0775 |

* cited by examiner

*Primary Examiner* — Michelle M Iacoletti
*Assistant Examiner* — Jarreas Underwood
(74) *Attorney, Agent, or Firm* — Guntin & Gust, PLC; Kenneth S. Kwan

(57) ABSTRACT

The technologies described herein are generally directed to using a loopback component to test a single fiber optic strand. For example, a method described herein can include generating a first optical beam of a first wavelength. The method can further include transmitting the first optical beam via a fiber optic fiber. Further, the method can include receiving via the fiber optic fiber, a second optical beam of a second wavelength, with the second optical beam having a characteristic of the first optical beam, and with the second optical beam being generated by a non-electrical conversion of the first light of the first wavelength to the second light of the second wavelength.

20 Claims, 10 Drawing Sheets

USING A LOOPBACK COMPONENT TO TEST A SINGLE FIBER OPTIC STRAND

TECHNICAL FIELD

The subject application is related to different approaches to handling fiber optic strands and, for example, to testing a fiber optic strand.

BACKGROUND

As fiber optic deployments increase, the reasons for testing fiber strands continues to increase. Inefficiencies can occur when approaches are used that require complex equipment on both sides of a tested strand. These inefficiencies can be aggravated when many strands that terminate in different areas need to be tested. Often multiple technicians are required to manage testing equipment on both sides of a tested strand.

BRIEF DESCRIPTION OF THE DRAWINGS

The technology described herein is illustrated by way of example and not limited in the accompanying figures in which like reference numerals indicate similar elements and in which.

DETAILED DESCRIPTION

Generally speaking, one or more embodiments of a system described herein can facilitate using a loopback component to test a single fiber optic strand, e.g., by a securing component that can provide a less permanent connection than other types of approaches. It should be understood that any of the examples and terms used herein are non-limiting. It should be noted that, as used to describe concepts herein, "non-electrical" can refer to a component that uses a battery as a source of power, e.g., such that the battery can be included in a loopback connector for affixing to a fiber optic cable, as discussed herein.

One having skill in the relevant art(s), given the disclosure herein understands that the mechanical systems, computer processing systems, computer-implemented methods, equipment (apparatus) and/or computer program products described herein can employ devices, hardware and/or software to solve problems that are highly technical in nature (e.g., testing individual fiber optic strands), that are not abstract and cannot be performed as a set of mental acts by a human. For example, a human, or even a plurality of humans, cannot efficiently, and with a high level of precision, test fiber optic strands with the same accuracy and convenience as one or more embodiments described herein.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate using a non-electrical loopback component to test a single fiber optic strand. Different examples that describe these aspects are included with the description of FIGS. 1-10 below. It should be noted that the subject disclosure may be embodied in many different forms and should not be construed as limited to this example or other examples set forth herein.

Figure 1:
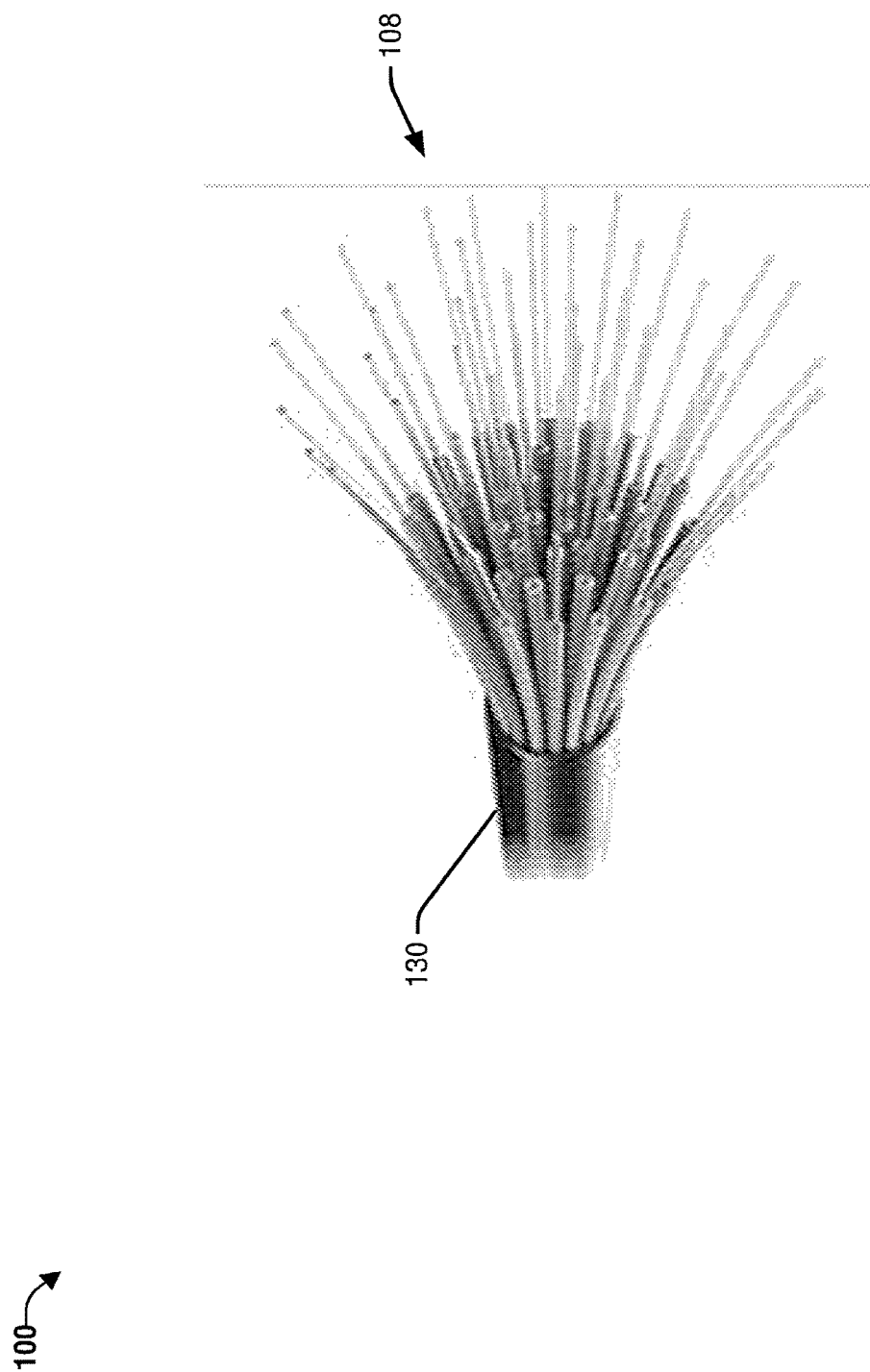
FIG. 1 is non-limiting example of a fiber optic implementation that can facilitate one or more embodiments described herein.
Figure 2:
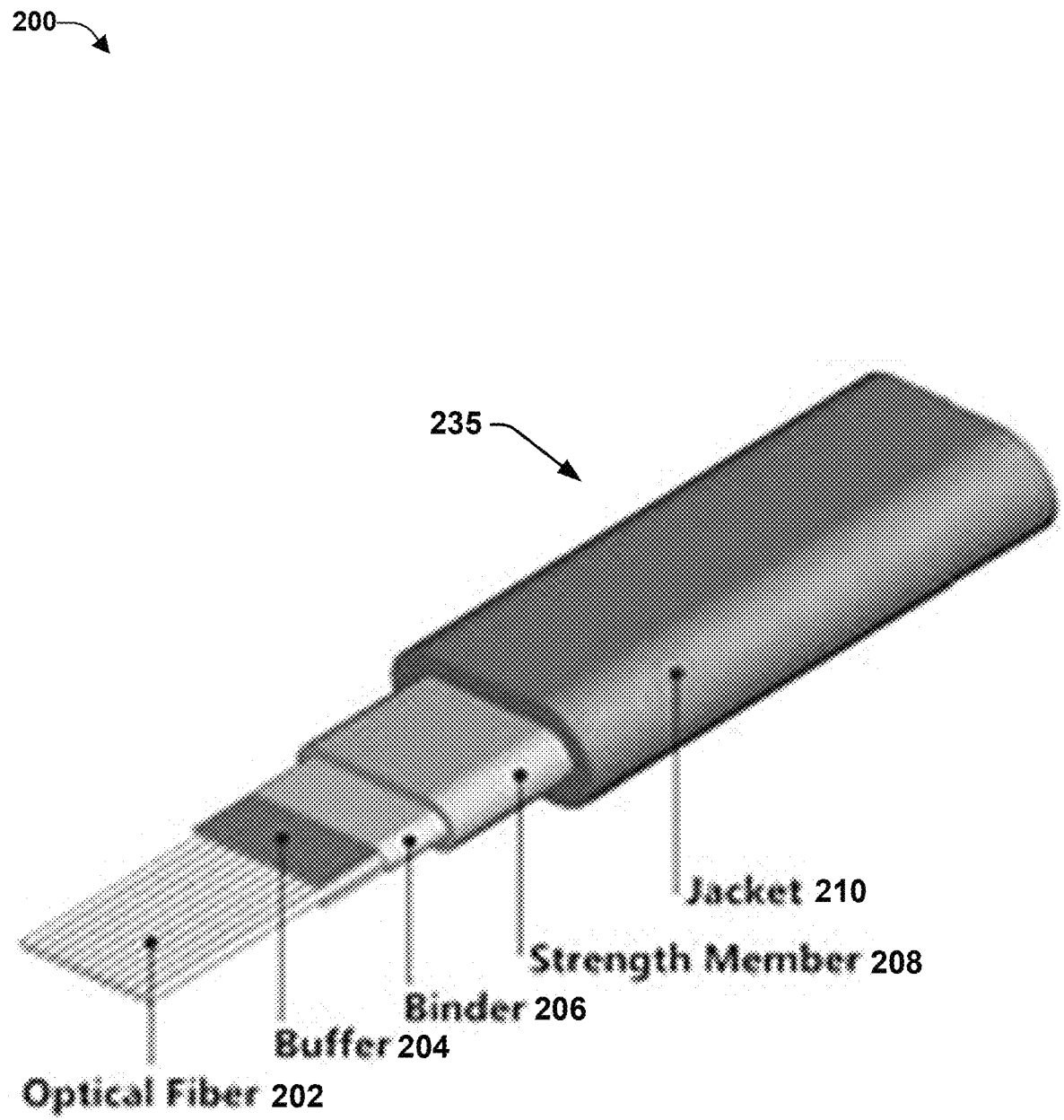
FIG. 2 is another non-limiting example of a fiber optic implementation that can facilitate one or more embodiments described herein.

FIGS. 1-2 are non-limiting examples of different fiber optic implementations 100 and 200 that can facilitate one or more approaches described herein. For purposes of brevity, description of some details described with different embodiments herein are omitted. FIG. 1 depicts multiple bare fiber optic strands 108 emerging from fiber optic cable 130 that holds the strands together for use.

As described further herein, one or more embodiments can be used to using a non-electrical loopback component to test a single fiber optic strand. It should be noted that the arrangement of fiber optic strands 108 in fiber optic cable 130 is not limiting, with different arrangements of one strand to many strands (e.g., as depicted in FIG. 3 discussed below) also being able to be handled by one or more embodiments described herein.

FIG. 2 depicts a system 200 that can facilitate using a non-electrical loopback component to test a single fiber optic strand, in accordance with one or more embodiments. For purposes of brevity, description of like elements and/or processes employed in other embodiments is omitted. As depicted, system 200 includes fiber optic cable 235 with jacket 210 surrounding strength member 208, binder 206, buffer 204, and optical fiber 202.

In an example use of the components of FIG. 2, as described below, one or more embodiments can enable attachment of an optical loopback controller the end of fiber optic cable 235 such that single optical fiber 202 can be tested. Stated differently, one or more embodiments can include a non-electrical loopback device comprising a connector that can facilitate affixation of the non-electrical loopback device to an end of a group of fiber optic fibers (e.g., optical fiber 202) comprised in the fiber optic medium (e.g., fiber optic cable 235).

Figure 3:
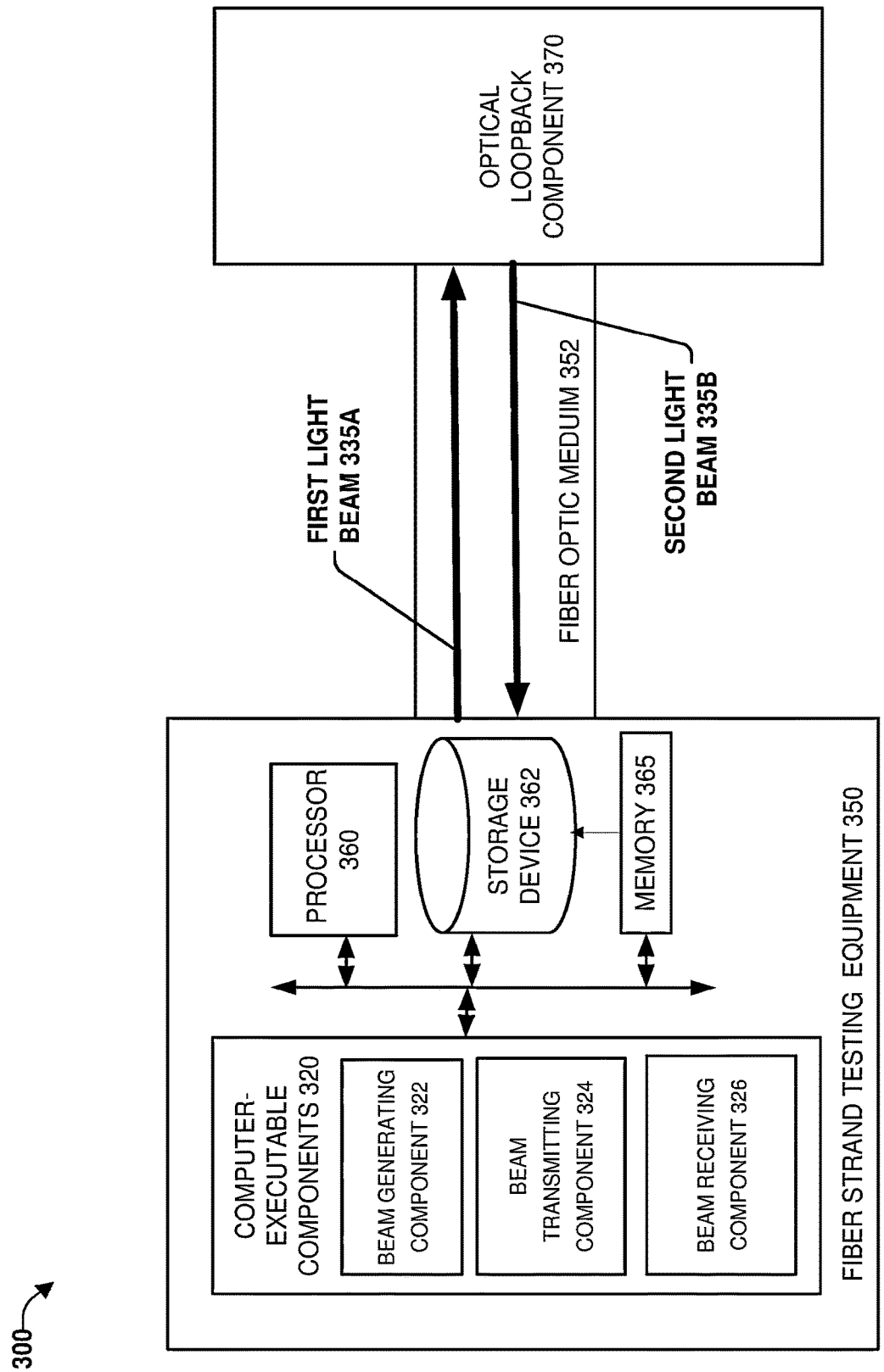
FIG. 3 is an architecture diagram of an example system that can facilitate using a non-electrical loopback component to test a single fiber optic strand, in accordance with one or more embodiments.

FIG. 3 is an architecture diagram of an example system 300 that can facilitate using a non-electrical loopback component to test a single fiber optic strand, in accordance with one or more embodiments. For purposes of brevity, description of like elements and/or processes employed in other embodiments is omitted. As depicted, system 300 includes fiber strand testing equipment 350 coupled to optical loopback component 370 via fiber optic medium 352. In one or more embodiments, fiber optic medium 352 can be a single fiber optic strand, with first light beam 335A being transmitted from fiber strand testing equipment 350 to optical loopback component 370, and also with second light beam 335B reflected back to fiber strand testing equipment 350, via the same fiber optic medium 352.

Fiber strand testing equipment 350 can include computer executable components 320, processor 360, storage device 362 and memory 365. Computer executable components 320 can include beam generating component 322, beam transmitting component 324, beam receiving component 326, and other components described or suggested by different embodiments described herein, that can improve the operation of system 300.

Further to the above, it should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, fiber strand testing equipment 350 can further comprise various computer and/or computing-based elements described herein with reference operating environment 1000 of

FIG. 10.

In some embodiments, memory 365 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 365 are described below with reference to system memory 1006 and FIG. 10. Such examples of memory 365 can be employed to implement any embodiments of the subject disclosure.

According to multiple embodiments, storage device 362 can include, but is not limited to, RAM, ROM, EEPROM, flash memory or other memory technology, solid state drive (SSD) or other solid-state storage technology, Compact Disk Read Only Memory (CD ROM), digital video disk (DVD), blu-ray disk, or other optical disk storage, magnetic cassettes, magnetic tape, magnetic disk storage or other magnetic storage devices, or any other medium which can be used to store the desired information and which can be accessed by the computer.

According to multiple embodiments, processor 360 can comprise one or more processors and/or electronic circuitry that can implement one or more computer and/or machine readable, writable, and/or executable components and/or instructions that can be stored on memory 365. For example, processor 360 can perform various operations that can be specified by such computer and/or machine readable, writable, and/or executable components and/or instructions including, but not limited to, logic, control, input/output (I/O), arithmetic, and/or the like. In some embodiments, processor 360 can comprise one or more components including, but not limited to, a central processing unit, a multi-core processor, a microprocessor, dual microprocessors, a microcontroller, a system on a chip (SOC), an array processor, a vector processor, and other types of processors. Further examples of processor 360 are described below with reference to processing unit 1004 of FIG. 10. Such examples of processor 360 can be employed to implement any embodiments of the subject disclosure.

In one or more embodiments, computer executable components 320 can be used in connection with implementing one or more of the systems, devices, components, and/or computer-implemented operations shown and described in connection with FIG. 3 or other figures disclosed herein. For example, in one or more embodiments, computer executable components 320 can include instructions that, when executed by processor 360, can facilitate performance of operations defining beam generating component 322. As discussed with different examples below, to utilize different components described herein beam generating component 322 can, in accordance with one or more embodiments, generate a first optical beam of a first wavelength.

Further, in one or more embodiments, computer executable components 320 can include instructions that, when executed by processor 360, can facilitate performance of operations defining beam transmitting component 324. As discussed with different examples below, to operate different components described herein beam transmitting component 324 can, in accordance with one or more embodiments, transmit the first optical beam via a fiber optic fiber.

To facilitate performance of operations for one or more embodiments, beam receiving component 326 can, receive via the fiber optic fiber, a second optical beam of a second wavelength, with the second optical beam having a characteristic of the first optical beam, and with the second optical beam being generated by a non-electrical conversion of the first light of the first wavelength to the second light of the second wavelength. As described further below, the second optical beam was generated by combining the first light of a first wavelength with a third light of the second wavelength (not depicted in FIG. 1) and filtering the first light from the third light, resulting in the second light of a second wavelength comprising the characteristic of the first optical beam.

Figure 4:
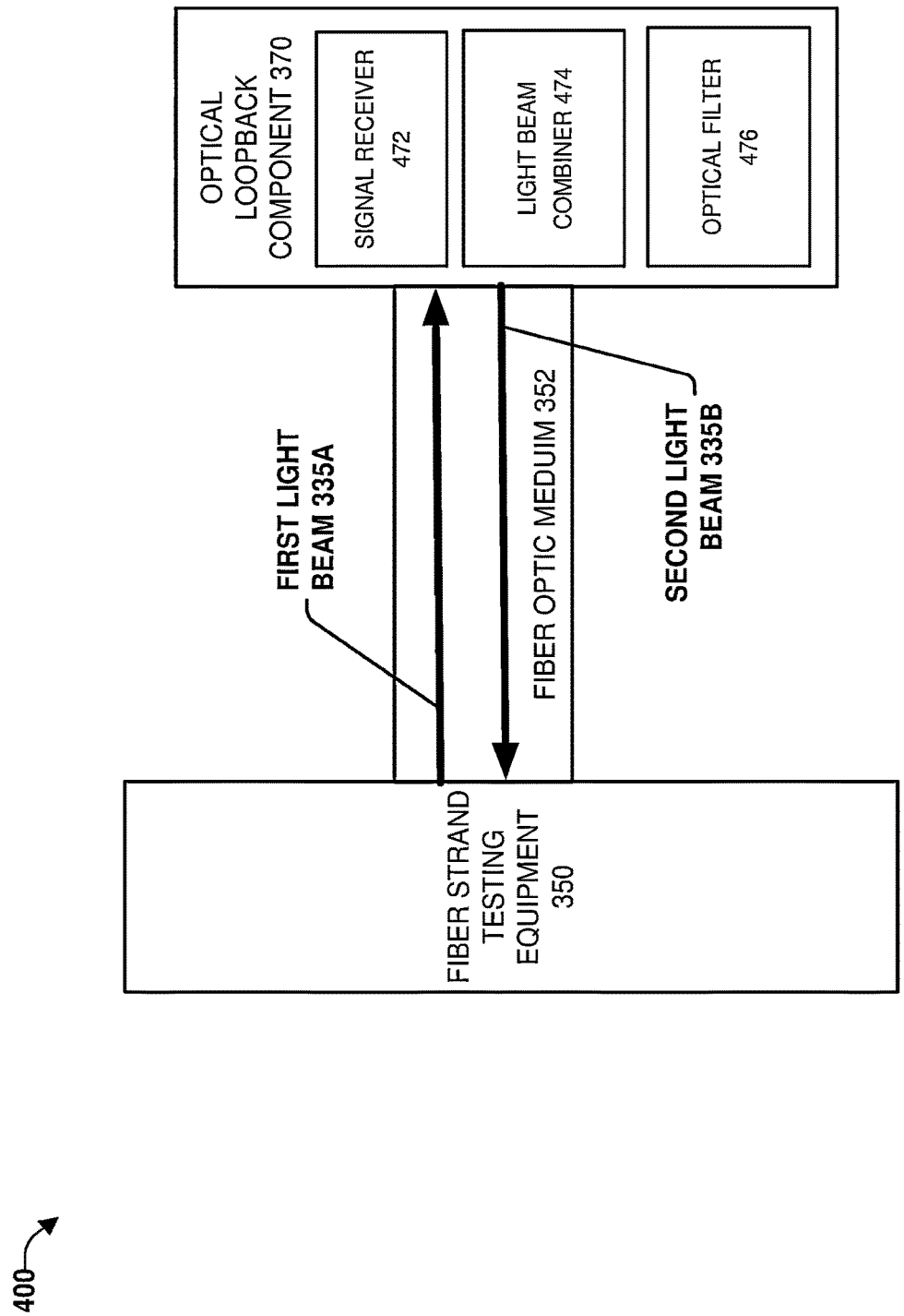
FIG. 4 depicts non-electrical system that can use components to reflect a light signal back to fiber strand testing equipment for testing via fiber optic medium, in accordance with one or more embodiments.

FIG. 4 depicts non-electrical system 400 that can use components to reflect a light signal back to fiber strand testing equipment 350 for testing via fiber optic medium 352, in accordance with one or more embodiments. For purposes of brevity, description of like elements and/or processes employed in other embodiments is omitted.

As noted above one or more embodiments can reverse (e.g., also termed loopback) optical signals (e.g., first light beam 335A) on a single fiber, e.g., fiber optic medium 352. In one or more embodiments, this capability can enable remotely testing fiber optic medium 352 from centralized test equipment, e.g., fiber strand testing equipment 350. In one or more embodiments, first light beam 335A can be converted from an initial unique specified wavelength, to second light beam 335B having a different unique specified wavelength that is selectable based on orientation of the attachment of the connector to the fiber optic cable.

In an implementation of optical loopback system 370, in one or more embodiments, signal receiver 472 can facilitate reception, via a fiber optic medium, of a first light signal corresponding to a first wavelength. For example, signal receiver 472 can facilitate reception, via fiber optic medium 352, of a first light beam 435 corresponding to a first wavelength.

In one or more embodiments, light beam combiner 474 can combine the first light signal with a second light signal to generate a third light signal (not depicted in FIG. 4), wherein the second light signal corresponds to a second wavelength different from the first wavelength, and wherein the combining modifies a characteristic of the second light signal based on the first light signal, resulting in a modified characteristic of the second light signal. Stated differently, in one or more embodiments, second light beam 335B can be a duplicate of first light beam 335A at a different wavelength, e.g., so as to avoid interference with first light beam 335A upon return to fiber strand testing equipment 350. In a variation of this, second light beam 335B can be a duplicate of a characteristic of first light beam 335A at a different wavelength, e.g., not a duplicate of all characteristics such as in the previous example.

Continuing discussion of this implementation, optical filter 476 can eliminate the first light signal from the third light signal to generate a third light signal. In the example depicted in FIGS. 3 and 4, the third light signal is not shown and the filtered light signal is depicted as second light beam 335B.

Returning to the discussion of the testing capabilities of fiber strand testing equipment 350, based on the duplicate of all (or part) of the characteristics of first light beam 335A, second light beam 335B can be tested for problems and, when a problem is associated with a duplicated characteristic, this problem of first light beam 335A can be detected in second light beam 335B by fiber strand testing equipment 350.

Thus, in an example, when the first light beam 335A is combined with another light beam (not shown) a characteristic of the light beam can be modified and incorporated in a combined light signal, e.g., second light beam 335B. At fiber strand testing equipment 350, the modified characteristic incorporated in second light beam 335B can be tested to assess a performance of the fiber optic medium 352 without any electrical conversion being used, e.g., that could change the results of the testing.

Figure 5:
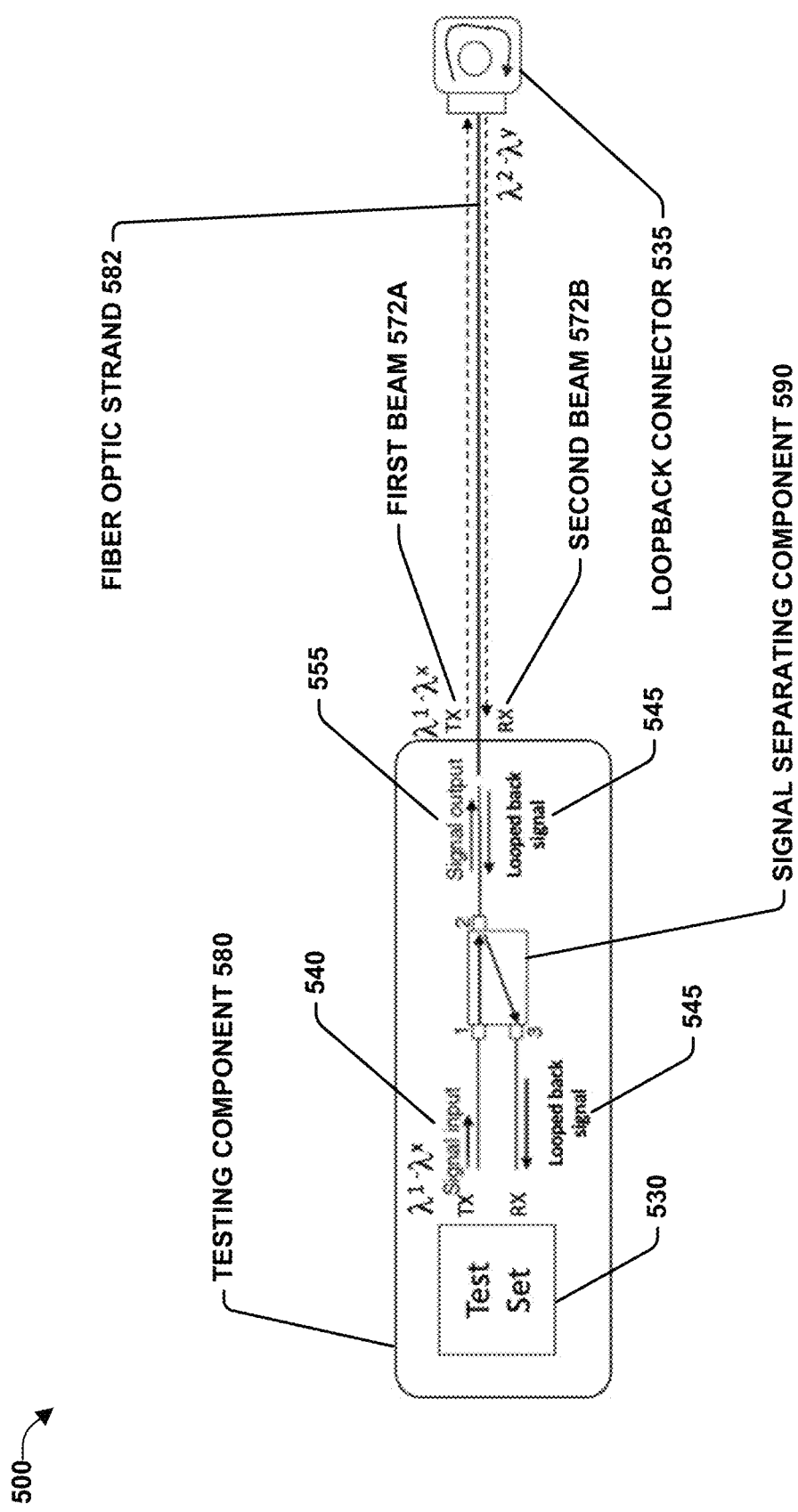
FIG. 5 is a diagram that depicts a non-limiting example operation of a system that can facilitate using a non-electrical loopback component to test a single fiber optic strand, in accordance with one or more embodiments.

FIG. 5 is a diagram that depicts system 500 that can facilitate using a non-electrical loopback component to test a single fiber optic strand, in accordance with one or more embodiments. For purposes of brevity, description of like elements and/or processes employed in other embodiments is omitted. As depicted, system 500 can include testing component 580 connected to loopback connector 535 via fiber optic strand 582 which conveys first beam 572A to loopback connector 535 and second beam 572B from loopback connector 535, in accordance with one or more embodiments.

In a variation of the example depicted in FIG. 3, testing component 580 can include a transmitter (e.g., beam generating component 322) to produce signal input 540 and a receiver (e.g., beam receiving component 326) to receive looped back signal 545. In an implementation depicted, signal separator component 590 can be used to facilitate signal input 540 being forwarded without change to signal output 555 to be transmitted as first beam 572A. Upon the receipt of second beam 572B via fiber optic strand 582 (e.g., traveling in an opposite direction from first beam 572A), based on this opposite direction, signal separating component 590 can separate out second beam 572B to be looped back signal 545. Test set 530 can thus include the output characteristics of first beam 572A to be compared with the input characteristics of second beam 572B. In an example implementation, signal separator component 590 can be an optical circulator component, e.g., a fiber-optic component that can be used to separate optical signals that travel concurrently in opposite directions over an optical fiber.

Figure 6:
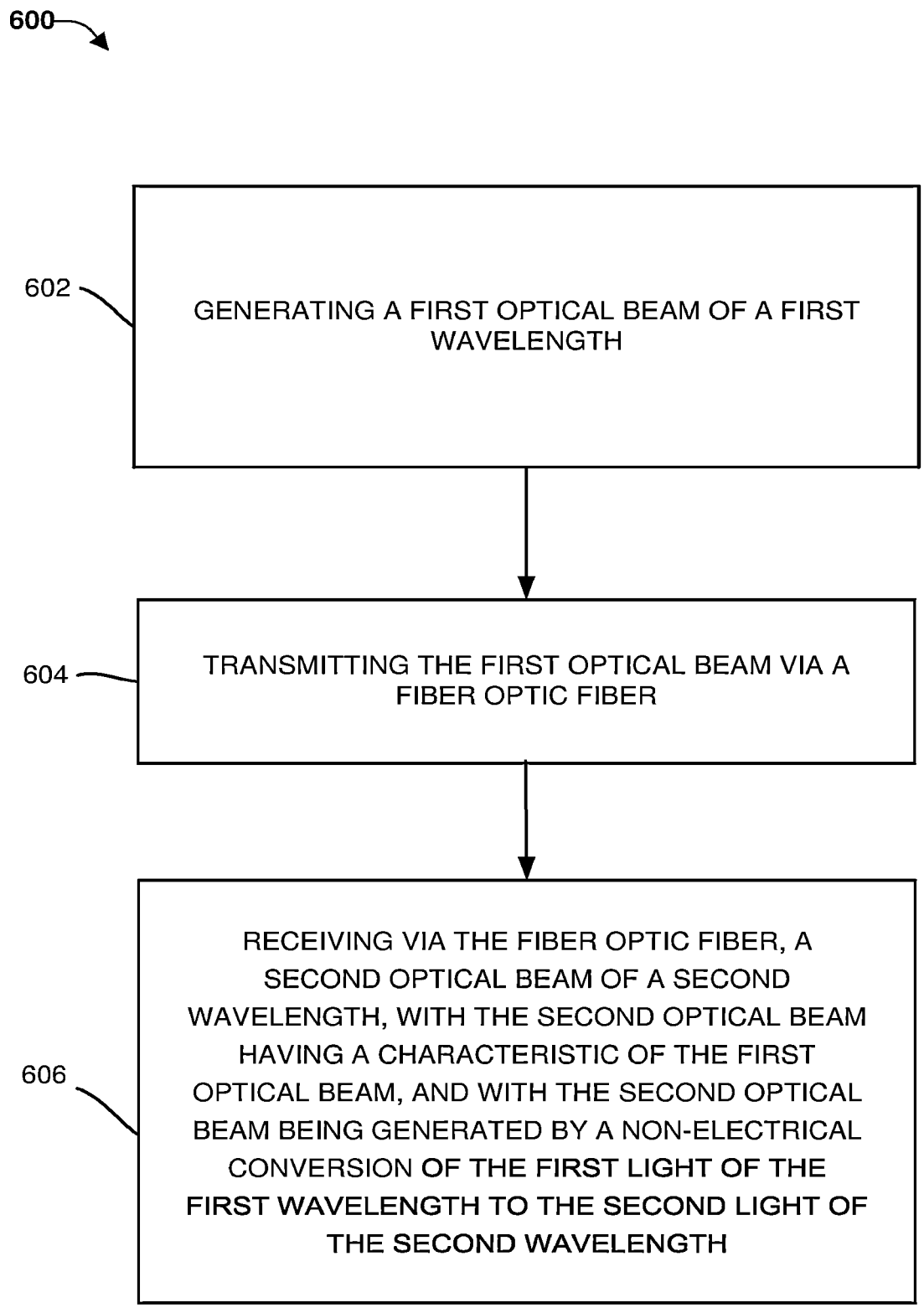
FIG. 6 illustrates an example method that can facilitate using a non-electrical loopback component to test a single fiber optic strand, in accordance with one or more embodiments.

FIG. 6 illustrates an example method 600 that can facilitate using a non-electrical loopback component to test a single fiber optic strand, in accordance with one or more embodiments. For purposes of brevity, description of like elements and/or processes employed in other embodiments is omitted.

At 602, method 600 can include generating a first optical beam of a first wavelength. At 604, method 600 can include transmitting the first optical beam via a fiber optic fiber. At 606, method 600 can include receiving via the fiber optic fiber, a second optical beam of a second wavelength, with the second optical beam having a characteristic of the first optical beam, and with the second optical beam being generated by a non-electrical conversion of the first light of the first wavelength to the second light of the second wavelength.

In additional or alternative embodiments, the fiber optic fiber can be implemented as a single mode fiber optic fiber. In additional or alternative embodiments, the non-electrical conversion of the first light of the first wavelength to the second light of the second wavelength can be implemented by using a non-electrical loopback element affixed to an end of a collection of fiber optic fibers comprising the fiber optic fiber. In additional or alternative embodiments, method 600 can further include assessing, by the network equipment, a performance metric applicable to the fiber optic fiber based on the receiving of the second optical beam.

In additional or alternative embodiments, method 600 can further include assessing the fiber optic fiber comprises assessing a signal integrity of the fiber optic fiber. In additional or alternative embodiments, as a result of the second optical beam being composed of the second light of the second wavelength, the receiving of the second optical beam can include receiving the second optical beam without interference from the first wavelength of the first light. In additional or alternative embodiments, the second optical beam can include a non-electrical reversal of the first optical beam. In additional or alternative embodiments, the fiber optic fiber can be implemented in a bidirectional infrastructure. In additional or alternative embodiments, method 600 can further include, assessing, by the network equipment, the fiber optic fiber based on a comparison of a first characteristic of the first optical beam to a second characteristic of the second optical beam.

Figure 7:
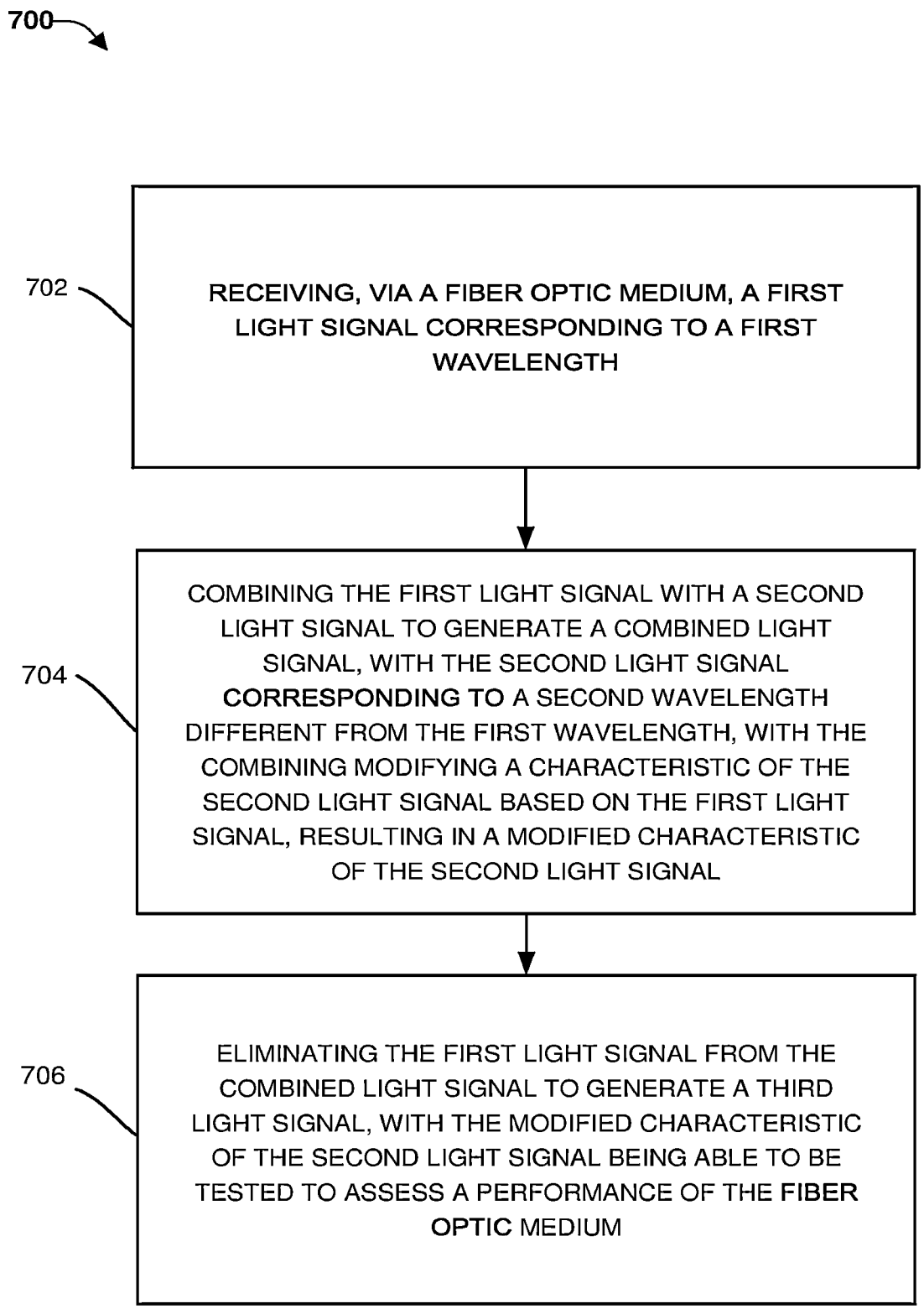
FIG. 7 illustrates an example method that can facilitate using a non-electrical loopback component to test a single fiber optic strand, in accordance with one or more embodiments.

FIG. 7 illustrates an example method 700 that can facilitate using a non-electrical loopback component to test a single fiber optic strand, in accordance with one or more embodiments. For purposes of brevity, description of like elements and/or processes employed in other embodiments is omitted.

At 702, method 700 can include receiving, via a fiber optic medium, a first light signal corresponding to a first wavelength. At 704, method 700 can include combining the first light signal with a second light signal to generate a combined light signal, with the second light signal corresponding to a second wavelength different from the first wavelength, with the combining modifying a characteristic of the second light signal based on the first light signal, resulting in a modified characteristic of the second light signal. At 706, method 700 can include eliminating the first light signal from the combined light signal to generate a third light signal, with the modified characteristic of the second light signal being able to be tested to assess a performance of the fiber optic medium.

In additional or alternative embodiments, method 700 can include conveying the third light signal via the fiber optic medium. In additional or alternative embodiments, based on the second wavelength, the third light signal can be conveyed by the conveyer via the fiber optic medium without interference by the first light signal. In additional or alternative embodiments, the first light signal can be of a first phase, and the third light signal can be conveyed without interference by the first light signal further based on the third light signal being generated in a second phase different from the first phase.

In additional or alternative embodiments, the third light signal can be conveyed without interference by the first light signal based on the fiber optic medium being a multimode fiber optic medium, and the third light signal being converted to a different mode from a mode of the first light signal.

In additional or alternative embodiments, method 700 can further comprise a non-electrical loopback device comprising a connector that facilitates affixation of the non-electrical loopback device to an end of a group of fiber optic fibers comprised in the fiber optic medium.

Figure 8:
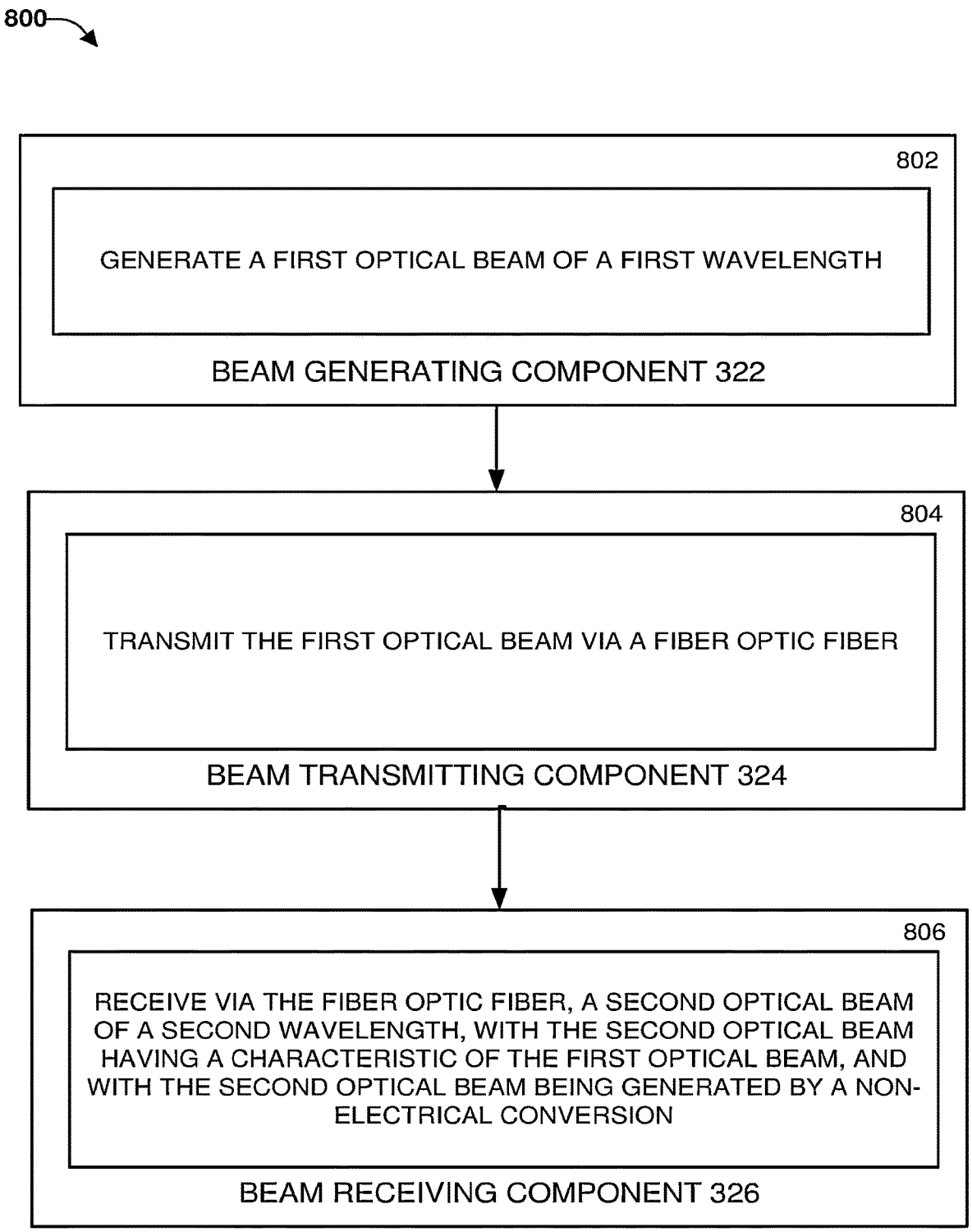
FIG. 8 illustrates an example method that can facilitate using a non-electrical loopback component to test a single fiber optic strand, in accordance with one or more embodiments.

FIG. 8 depicts a system 800 that can facilitate using a non-electrical loopback component to test a single fiber optic strand, in accordance with one or more embodiments. For purposes of brevity, description of like elements and/or processes employed in other embodiments is omitted. As depicted, system 800 can include beam generating component 322, beam transmitting component 324, and beam receiving component 326, with other components described or suggested by different embodiments described herein, that can improve the operation of system 900.

In an example, component 802 can include the functions of beam generating component 322, supported by the other layers of system 800. For example, component 802 can generate a first optical beam of a first wavelength.

In an example, component 804 can include the functions of beam transmitting component 324, supported by the other layers of system 800. For example, component 804 can transmit the first optical beam via a fiber optic fiber.

In an example, component 806 can include the functions of beam receiving component 326, supported by the other layers of system 800. For example, component 806 can receive via the fiber optic fiber, a second optical beam of a second wavelength, with the second optical beam having a characteristic of the first optical beam, and with the second optical beam being generated by a non-electrical conversion.

Figure 9:
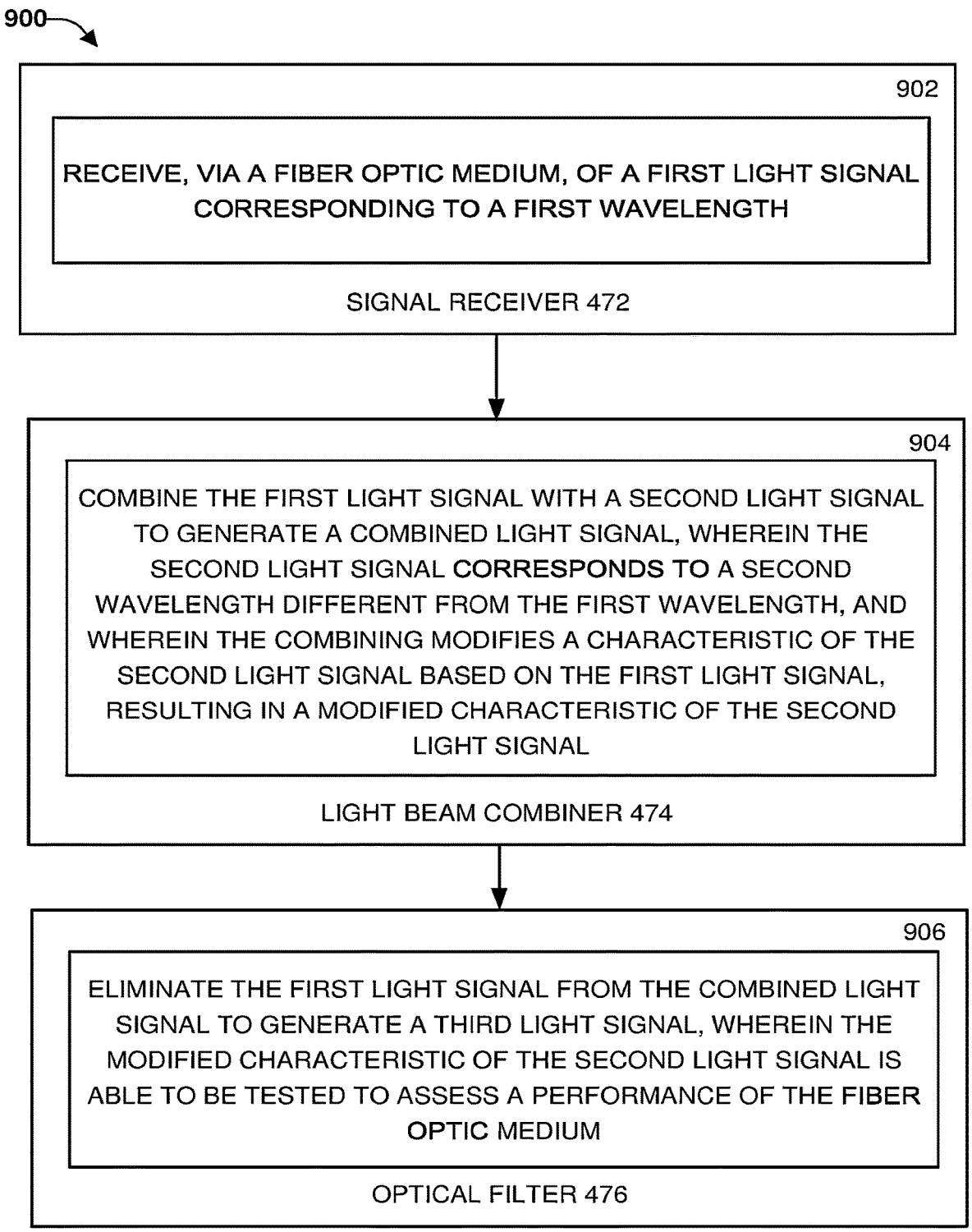
FIG. 9 depicts a system that can facilitate using a non-electrical loopback component to test a single fiber optic strand, in accordance with one or more embodiments.

FIG. 9 depicts a system 900 that can facilitate using a non-electrical loopback component to test a single fiber optic strand, in accordance with one or more embodiments. For purposes of brevity, description of like elements and/or processes employed in other embodiments is omitted.

As depicted, system 900 can include signal receiver 472, light beam combiner 474, optical filter 476, and other components described or suggested by different embodiments described herein, that can improve the operation of system 900.

In an example, component 902 can include the functions of signal receiver 472, supported by the other layers of system 900. For example, in one or more embodiments, component 902 can facilitate reception, via a fiber optic medium, of a first light signal corresponding to a first wavelength.

For example, component 904 can include the functions of light beam combiner 474, supported by the other layers of system 900. For example, in one or more embodiments, component 904 can combine the first light signal with a second light signal to generate a combined light signal, wherein the second light signal corresponds to a second wavelength different from the first wavelength, and wherein the combining modifies a characteristic of the second light signal based on the first light signal, resulting in a modified characteristic of the second light signal.

In an example, component 906 can include the functions of optical filter 476, supported by the other layers of system 900. For example, component 906 can eliminates the first light signal from the combined light signal to generate a third light signal, wherein the modified characteristic of the second light signal is able to be tested to assess a performance of the fiber optic medium.

In additional or alternative embodiments, the operations can further comprise, conveying the third fiber optic signal via the fiber optic cable. In additional or alternative embodiments, conveying the third fiber optic signal can include, based on the second wavelength, conveying the third fiber optic signal via the fiber optic cable free of interference from the first fiber optic signal. In additional or alternative embodiments, the filtering eliminates the first light signal from the combined fiber optic signal based on the first wavelength.

Figure 10:
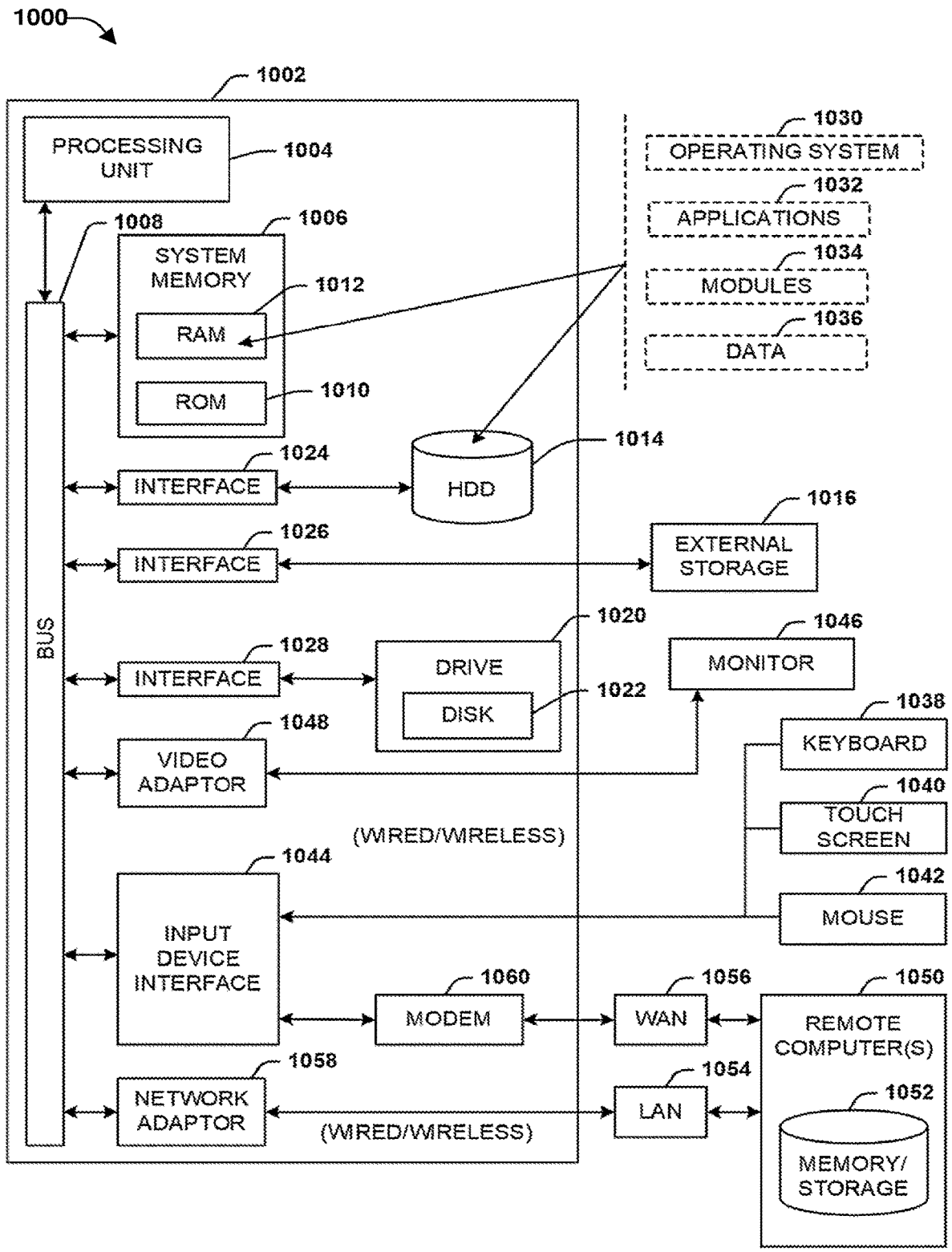
FIG. 10 illustrates an example block diagram of an example computer operable to engage in a system architecture that can facilitate processes described herein, in accordance with one or more embodiments.

FIG. 10 provides additional context for various embodiments described herein, intended to provide a brief, general description of a suitable operating environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IOT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example operating environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid-state drive, an optical disk drive, which can read or write from a disk 1022, such as a CD-ROM disc, a DVD, a BD, etc. Alternatively, where a solid-state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002. e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment do not normally connect directly to the core networks of a large service provider, but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. An optical loopback system, comprising:
a signal receiver that facilitates reception, via a fiber optic medium, of a first light signal corresponding to a first wavelength;
a light signal combiner that obtains the first light signal received by the signal receiver and combines the first light signal received by the signal receiver with a second light signal to generate a combined light signal, wherein the second light signal is a duplicate of the first light signal but having a second wavelength different from the first wavelength, and wherein the combining modifies a characteristic of the second light signal based on the first light signal, resulting in a modified characteristic of the second light signal; and
a filter that eliminates the first light signal from the combined light signal to generate a third light signal, wherein the modified characteristic of the second light signal is able to be tested to assess a performance of the fiber optic medium.

2. The optical loopback system of claim 1, wherein the signal receiver, the light signal combiner, and the filter are positioned at one end of the fiber optic medium, wherein the first light signal is transmitted by a signal transmitter positioned at another end of the fiber optic medium, and wherein the optical loopback system further comprises a conveyer positioned at the one end of the fiber optic medium that conveys the third light signal via the fiber optic medium as a loopback signal to the signal transmitter positioned at the another end of the fiber optic medium.

3. The optical loopback system of claim 2, wherein, based on the second wavelength, the third light signal is conveyed by the conveyer via the fiber optic medium without interference by the first light signal.

4. The optical loopback system of claim 3, wherein the first light signal comprises a first phase, and wherein the third light signal is conveyed without interference by the first light signal further based on the third light signal being generated in a second phase different from the first phase.

5. The optical loopback system of claim 3, wherein the third light signal is conveyed without interference by the first light signal based on:
the fiber optic medium being a multimode fiber optic medium, and
the third light signal being converted to a different mode from a mode of the first light signal.

6. The optical loopback system of claim 1, wherein the optical loopback system further comprises a non-electrical loopback device comprising a connector that facilitates affixation of the non-electrical loopback device to an end of a group of fiber optic fibers comprised in the fiber optic medium.

7. The optical loopback system of claim 1, wherein the second light signal comprises a non-electrical reversal of the first light signal.

8. A system, comprising:
a processor; and
a memory that stores executable instructions that, when executed by the processor, facilitate performance of operations, comprising:
receiving, via a fiber optic cable, a first fiber optic signal comprising a first wavelength;
based on the receiving the first fiber optic signal, combining the first fiber optic signal with a second fiber optic signal to generate a combined fiber optic signal, wherein the second fiber optic signal is a duplicate of the first fiber optic signal but comprises a second wavelength different from the first wavelength, and wherein the combining modifies a characteristic of the second fiber optic signal based on the first fiber optic signal, resulting in a modified characteristic of the second fiber optic signal; and
filtering to remove the first fiber optic signal from the combined fiber optic signal to generate a third fiber optic signal, wherein a result of assessing the modified characteristic of the second fiber optic signal is usable to assess a performance of the fiber optic cable.

9. The system of claim 8, wherein the operations further comprise, conveying the third fiber optic signal via the fiber optic cable.

10. The system of claim 9, wherein conveying the third fiber optic signal comprises, based on the second wavelength, conveying the third fiber optic signal via the fiber optic cable free of interference from the first fiber optic signal.

11. The system of claim 8, wherein the filtering uses the first wavelength to eliminate the first fiber optic signal from the combined fiber optic signal.

12. A method, comprising:
receiving, by a loopback system and via a fiber optic cable, a first fiber optic signal comprising a first wavelength;
based on the receiving the first fiber optic signal, combining, by the loopback system, the first fiber optic signal with a second fiber optic signal to generate a combined fiber optic signal, wherein the second fiber optic signal is a duplicate of the first fiber optical signal but comprises a second wavelength different from the first wavelength, and wherein the combining modifies a characteristic of the second fiber optic signal based on the first fiber optic signal, resulting in a modified characteristic of the second fiber optic signal; and
filtering, by the loopback system, to remove the first fiber optic signal from the combined fiber optic signal to generate a third fiber optic signal, wherein a result of assessing the modified characteristic of the second fiber optic signal is usable to assess a performance of the fiber optic cable.

13. The method of claim 12, wherein the receiving is performed by a signal receiver of the loopback system.

14. The method of claim 12, wherein the combining is performed by a light beam combiner of the loopback system.

15. The method of claim 12, wherein the filtering is performed by an optical filter of the loopback system.

16. The method of claim 12, further comprising conveying, by the loopback system, the third fiber optic signal via the fiber optic cable.

17. The method of claim 16, wherein conveying the third fiber optic signal comprises, based on the second wavelength, conveying the third fiber optic signal via the fiber optic cable free of interference from the first fiber optic signal.

18. The method of claim 12, wherein the filtering uses the first wavelength to eliminate the first fiber optic signal from the combined fiber optic signal.

19. The method of claim 12, wherein the loopback system comprises a non-electrical loopback device.

20. The method of claim 12, wherein the second fiber optic signal comprises a non-electrical reversal of the first fiber optic signal.

* * * * *